(12) United States Patent
Megarity et al.

(10) Patent No.: US 8,289,996 B2
(45) Date of Patent: Oct. 16, 2012

(54) MULTI-PURPOSE PDU CONTAINER FOR DELINEATING PDU DATAGRAMS AND PDU DATAGRAM ATTRIBUTES IN AN 8B/10B CODED SYSTEM

(75) Inventors: Mark R. Megarity, Ottawa (CA); Joey Chow, Nepean (CA); Richard Grieve, Ottawa (CA)

(73) Assignee: Alcatel Lucent, Paris (FR)

( * ) Notice: Subject to any disclaimer, the term of this patent is extended or adjusted under 35 U.S.C. 154(b) by 306 days.

(21) Appl. No.: 12/194,589

(22) Filed: Aug. 20, 2008

(65) Prior Publication Data

US 2010/0046548 A1 Feb. 25, 2010

(51) Int. Cl.
*H04J 3/24* (2006.01)
(52) U.S. Cl. ...................................................... 370/474
(58) Field of Classification Search ................... None
See application file for complete search history.

(56) References Cited

U.S. PATENT DOCUMENTS

| 4,703,475 | A | * | 10/1987 | Dretzka et al. | ............... | 370/394 |
| 4,970,714 | A | * | 11/1990 | Chen et al. | .................... | 370/216 |
| 5,579,316 | A | * | 11/1996 | Venters et al. | ................ | 370/392 |
| 2002/0167945 | A1 | * | 11/2002 | Shin et al. | ..................... | 370/389 |
| 2003/0198226 | A1 | * | 10/2003 | Westberg | ...................... | 370/393 |

* cited by examiner

*Primary Examiner* — Chi Pham
*Assistant Examiner* — Kouroush Mohebbi
(74) *Attorney, Agent, or Firm* — Kramer & Amado, P.C.

(57) ABSTRACT

A method of reducing overhead for datagrams that are transmitted to or received from a serial link that reduces overhead to no more than four bytes. The datagram includes at least a Protocol Data Unit (PDU) field, a Start-of-PDU Header (SPH) field, and a SPH Control (SCH) field. The SPH and SCH fields consist of two bytes. The datagram may additionally include End-of-PDU Header (EPH) and EPH Control (ECH) fields. A method may also involve substitution of flags for subsequent headers that are identical to previous headers.

3 Claims, 6 Drawing Sheets

MULTI-PURPOSE PDU CONTAINER FOR DELINEATING PDU DATAGRAMS AND PDU DATAGRAM ATTRIBUTES IN AN 8B/10B CODED SYSTEM

BACKGROUND OF THE INVENTION

1. Field of the Invention

This invention relates generally to serial transmission of datagrams. In particular, it relates to a method for reducing the amount of bandwidth utilized by datagrams.

2. Description of Related Art

A typical communications network is structured under the Open Systems Interconnection (OSI) model. The OSI model is an abstract description for computer network protocol design that divides network architecture into seven hierarchical layers: application (L7), presentation (L6), session (L5), transport (L4), network (L3), data-link (L2), and physical (L1). In the physical layer, data are transmitted over a physical link that often uses serial transmission.

Because serial links may only send one datagram at a time, data in a parallel format must first be converted into serial format before the data is sent. To accomplish this goal, data is broken up into a number of smaller portions, often referred to as datagrams. The parallel width of each datagram may be fixed, such that a predetermined amount of data is sent over the link at a particular time.

In order to properly decode the datagrams sent over the link, the receiver must be able to identify the start and stop of each datagram. Accordingly, each transmitter includes a delineation mechanism that allows the transmitter to mark the start and stop of each datagram in a way that the receiver understands. Some encoding schemes provide relatively simple mechanisms to delineate data across the serial link. For example, some schemes append a datagram header to uniquely identify and differentiate each datagram or include special character sequences to mark the start and end of a datagram. Based on the information in the header or the character sequences, the receiver may identify each piece of data sent over the link.

One example of an encoding scheme used for serial links is the 8B/10B protocol, which may be used for transmission of datagrams through optical fibers and shielded copper media. This scheme is used for all gigabit Ethernet options, except twisted-pair, and is also used in Fibre Channel, a gigabit-speed network technology primarily used for storage networking.

To implement the 8B/10B protocol, eight bits of data are converted into ten bits for transmission. Although use of the 8B/10B encoding algorithm adds 25% overhead to each character, 8B/10B encoding also provides several advantages. First, the 8B/10B protocol can be implemented by relatively simple transceivers at low cost. Second, the encoding scheme is well-balanced and reliable, having a substantially equal number of "one" and "zero" bits across any sequence. Third, the protocol promotes easier clock recovery to a high transition density and provides a significant error detection capability.

A typical datagram encoded using 8B/10B includes a first k-character sequence to mark the start of the datagram and a second k-character sequence to mark the end of the datagram. The datagram may also include a header, a sequence of characters used to uniquely identify each datagram. The assembly of headers may involve layer-by-layer encapsulation, a process in which the overall header is built from subfields corresponding to each Open System Interconnection (OSI) layer. Thus, a header may include data link, network, transport, session, and presentation layer subfields.

Therefore, in a typical 8B/10B system, a portion of the available bandwidth is used to delineate the datagram to a PDU size of a known length and to transmit datagram header information. The addition of characters indicating the start and end of each PDU adds further overhead to each datagram. To compound the problem, since most typical systems handle the parallelized serial data in 2-byte, 4-byte or, n-byte widths, character groups used to delineate are typically repeated across the channel in n-byte widths, thus consuming more bandwidth. Given the significant number of datagrams sent over a given serial link, minor inefficiencies in each datagram can combine to result in significant performance losses.

Accordingly, there is a need for a modified datagram that minimizes bandwidth usage when sent over a serial link, while still enabling reliable delineation. There is a further need for a mechanism that allows for reduction of bandwidth usage on a serial link by eliminating the need to send a full header with every datagram.

The preceding objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for a more bandwidth-efficient datagram, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a method of encoding a datagram transmitted to or received from a serial link, comprising the following steps: obtaining a Protocol Data Unit (PDU) field that comprises customer traffic; adding a Start-of-PDU Header (SPH) field; and adding a SPH Control (SCH) field, wherein the assembled datagram has no more than four bytes of overhead. The method may further comprise the following steps: adding an End-of-PDU Header (EPH) field; and adding an EPH Control (ECH) field.

In various exemplary embodiments, the SCH field may be appended before an initial byte of the PDU field and the EPH field is placed after a final byte of the PDU field. Alternatively, the SCH and EPH fields may be contiguous.

In various exemplary embodiments, the PDU field may have a variable length and the ECH field may identify the length of the PDU fields. Alternatively, the PDU field may have a fixed length.

In various exemplary embodiments, the PDU field may have a fixed length and the SPH and SCH fields may consist of two bytes. Alternatively, the PDU field may have a variable length and the SPH field may identify the length of the PDU field. In another exemplary embodiment, the PDU field may have a variable length and the SPH field of the next datagram may define the length of the current PDU field by marking its last byte. In an additional exemplary embodiment, the PDU field may have a variable length and an IDLE sequence may define the length of the current PDU field by marking its last byte.

In various exemplary embodiments, a method of transferring data across a serial link may comprise the following steps: receiving a group of sequential data packets at a transmitter, each data packet comprising an identical header; generating a flag that identifies the header; transmitting a first data packet from the group with the flag to a receiver; for all subsequent data packets in the group, replacing the header with the generated flag; and transmitting the subsequent data packets with the flags to the receiver.

In various exemplary embodiments, the group of sequential data packets may be placed into a queue. The transmitter may analyze the queue while generating the flag. The method may further comprise the steps of receiving the group of data packets at the receiver; for all data packets in the group that lack the header, replacing the flag with the header; and rebuilding the data packets after replacing the flag with the header. The flag may comprise an 8B/10B control character.

In various exemplary embodiments, a communication system that reduces bandwidth consumed by headers of data packets may comprise a transmitter having a first input port, a first processor, a first output port, and a first storage medium, wherein the first processor is coupled to the first input port, the first output port, and the first storage medium; a receiver having a second input port, a second processor, a second output port, and a second storage medium, wherein the second processor is coupled to the second input port, the second output port, and the second storage medium; a serial link coupling said receiver to said transmitter, whereby signals from said first output port of said transmitter are sent to said second input port of said receiver; wherein said transmitter converts said headers into a compressed format.

In various exemplary embodiments, the transmitter may convert headers into the compressed format by assembling a datagram having at least Start-of-PDU Header (SPH) field and SPH Control (SCH) fields that consume no more than four bytes of overhead. The transmitter may convert headers into the compressed format by replacing redundant headers with flags. The flags may be 8B/10B control characters. The receiver may convert the flags back into headers, thereby restoring an original format of the data packets.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
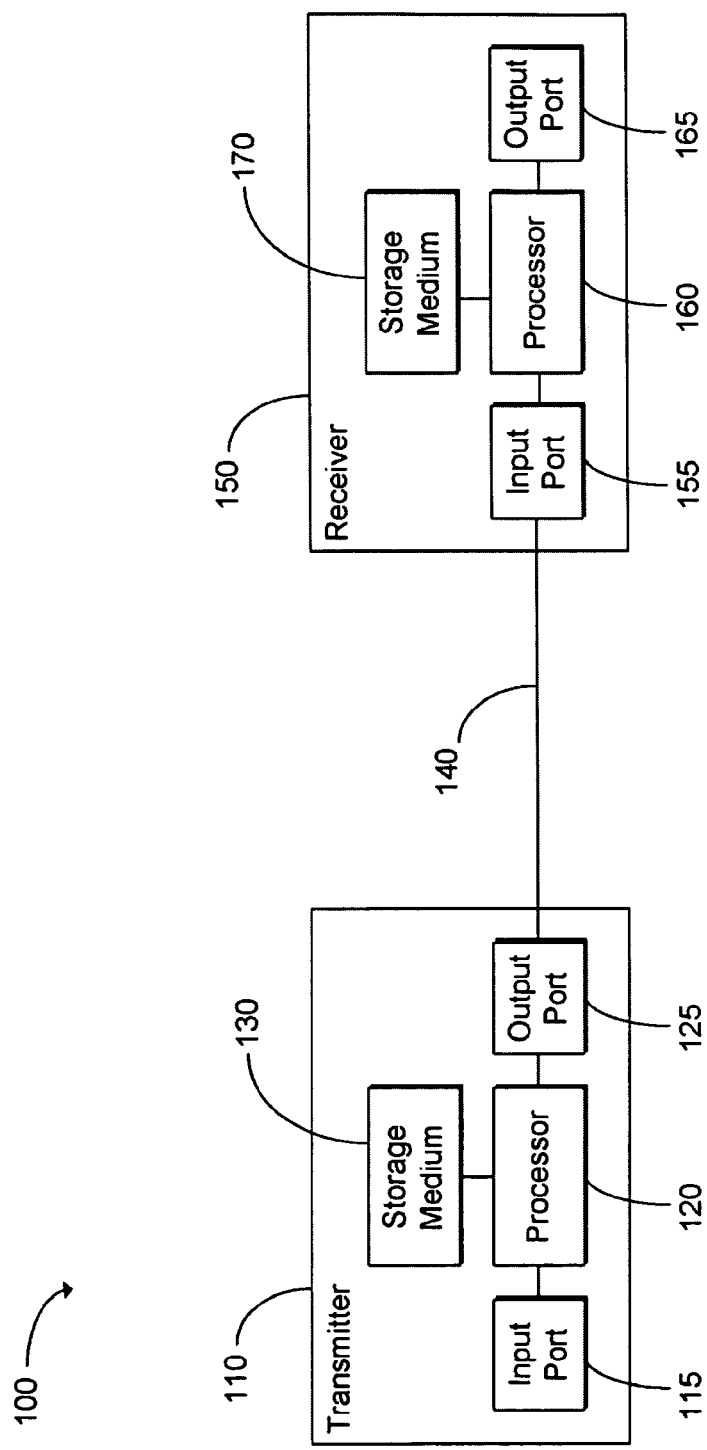
FIG. 1 depicts a system for serial transmission of datagrams, the system including a transmitter and a receiver.

Referring now to the drawings, in which like numerals refer to like components or steps, there are disclosed broad aspects of various exemplary embodiments.

FIG. 1 depicts a system 100 for serial transmission of datagrams, the system 100 including a transmitter 110 and a receiver 150.

In various exemplary embodiments, transmitter 110 comprises a processor 120 coupled to an input port 115, an output port 125, and a storage medium 130. Processor may be a Field Programmable Gate Array (FPGA) or any other processor known to those of skill in the art. Computer-readable storage medium 130 may be a hard drive, flash memory drive, Random Access Memory (RAM), or any other storage medium known to those of skill in the art. As described in further detail below, storage medium 130 may temporarily store packets, generated flags, and any other data necessary for transfer of datagrams across serial link 140.

In operation, datagrams flow into processor 120 through input port 115, may be temporarily stored on computer-readable storage medium 130, and then exit processor 120 through output port 125. Serial link 140, which receives datagrams from output port 125, then couples transmitter 110 to receiver 150.

Receiver 150 comprises a processor 160 coupled to an input port 155, an output port 165, and a storage medium 170. Datagrams from serial link 140 flow into processor 160 through input port 155, may be temporarily stored on computer-readable storage medium 170, and exit processor 160 through output port 165. It should be apparent that processor 160 may be configured similarly to processor 120, while storage medium 170 may be configured similarly to storage medium 130.

In various exemplary embodiments, system 100 is used to transmit bandwidth-saving datagrams described further below with reference to FIGS. 3-9. Alternatively, system 100 may be used to compress datagrams by implementing a flag-based compression mechanism, as further detailed below with reference to FIGS. 10-11.

Figure 2:
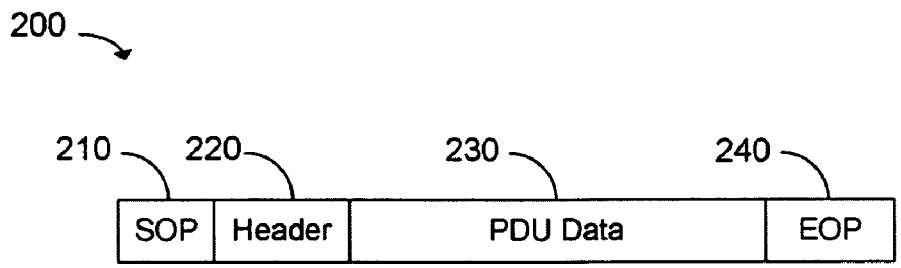
FIG. 2 depicts a datagram according to the related art.

FIG. 2 depicts a datagram 200 according to the related art. As depicted in FIG. 2, datagram 200 has four sections. PDU data field 210 is a 1 to n-byte group of data characters. Datagram header 220, located to the front of PDU data field 210, has h-bytes. Header 220 may contain Start-Of-Frame (SOF), End-Of-Frame (EOF), abort, multi-channel address, priority, parity, and other subfields. Identifier fields 210, 240 appear on both sides of the header-PDU combination. A two-byte Start-of-PDU (SOP) field 210 delineates the front of datagram 200, while a two-byte End-of-PDU (EOP) field 240 marks the end of datagram 200.

In a typical 8B/10B coded system with a 2-byte parallel interface within the processing device, n-byte datagram 200 would be sent across a serial link with at the Start-Of-Frame (SOF), End-of-Frame (EOF), and abort data fields. In this situation, PDU data field 230 would comprise n-bytes while datagram header 220 would comprise h-bytes including at least SOF, EOF, and abort fields, as mentioned above. SOP field 210 would have a 2-byte character sequence pair for Start-of-PDU delineation across a serial link (/SCP/SCP), such as link 140 in FIG. 1. Similarly, EOP field 204 would have a 2-byte character sequence pair for End-of-PDU delineation across a serial link (/ECP/ECP), such as link 140 in FIG. 1.

Thus, datagram 200 would consist of (n+h+4) bytes. Therefore, transmitting or receiving (n+h+4) bytes from a serial link, such as link 140 in FIG. 1, would have an overhead cost of (1−[n/(n+h+4)])*100%. Given the inefficiencies in the datagram contents, this overhead cost could significantly reduce profitability of the serial link.

Across a typical serial link, when data are converted from parallel to serial or serial to parallel, the parallel width is such that it allows for data processing at lower rates within programmable devices or Application Specific Integrated Circuits (ASICs). Hence, the parallel width is typically fixed at 2-byte, 4-bytes, or greater. This poses an issue with respect to bandwidth utilization since special code groups used to delineate the start and the end of the PDU are repeated in pairs across all n-bytes in the parallel interface. This repetition can waste further bandwidth across the serial link.

Figure 3:
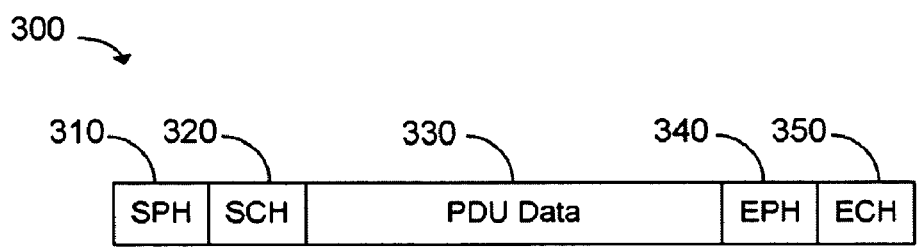
FIG. 3 depicts a datagram for transmission across a serial link according to a first exemplary embodiment.

FIG. 3 depicts a datagram 300 for transmission across a serial link according to a first exemplary embodiment. Datagram 300 has a PDU data field 330 similar to PDU data field 230 of datagram 200. A Start-of-PDU Header (SPH) byte 310 is located in the front of the serial link encapsulation. This SPH byte 310 indicates whether PDU data field 330 has a normal status or an abort status. This indication may be achieved by means of different k-character groups. A Start-of-PDU Header Control (SCH) byte 320 may contain, but is not limited to, SOF, EOF, address, priority, and parity fields.

Two bytes then appear at the end of 1 to n-byte datagram 300. The End-of-PDU Header (EPH) byte 340 delineates the end of datagram 300. The End-of-PDU Header Control (ECH) byte 350 may contain, but is not limited to, a Cyclic Redundancy Code (CRC). A CRC byte may efficiently detect accidental alteration of data.

Thus, as compared to datagram 200, described above with reference to FIG. 2, the use of datagram 300 reduces overall bandwidth consumption and frees up bandwidth for more customer traffic. Since it is necessary to transmit a Start-of-PDU and End-of-PDU sequence, this transmission must consume at least four bytes. However, combining the Start-of-PDU, End-of-PDU, and datagram header attributes into a common container consisting of a maximum of four bytes reduces the overhead required for datagram 300.

To summarize, datagram 300 contains the following number of bytes. First, SPH field 310 and SCH field 320 consist of two bytes. Next, PDU data field 330 consists of n-bytes. EPH field 340 and ECH field 350, located on the opposite side of PDU data field 330 from the SPH 310 and SCH 320 fields, consist of two bytes. Thus, the total size of datagram 300 is (n+4) bytes, making it significantly smaller than datagram 200.

Therefore, datagram 300 would enable a user to transmit or receive (n+4) bytes from a serial link with an overhead of only (1−[n/(n+4)])*100%. When a serial link is running at a high rate, such as the gigabaud range, the additional savings achieved by using datagram 300 instead of datagram 200 increases the amount of overall bandwidth available for additional revenue generating customer traffic.

Figure 4:
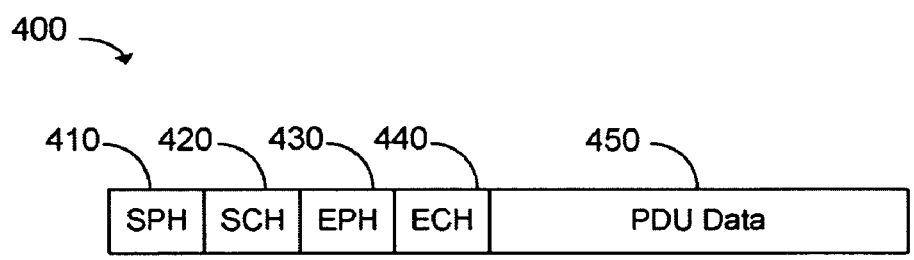
FIG. 4 depicts a datagram for transmission across a serial link according to a second exemplary embodiment.

FIG. 4 depicts datagram 400 for transmission across a serial link according to a second exemplary embodiment. Datagram 400 has the following fields: an SPH field 410, an SCH field 420, an EPH field 430, and an ECH field 440, and a PDU data field 450. Unlike FIG. 3, where the SCH field 320 and the EPH field 340 are located on opposite sides of PDU data field 330, datagram 400 has EPH 430 and ECH 440 bytes located immediately after the SPH 410 and SCH 420 bytes. Thus, they are not placed at the end of the PDU data field 450. SCH field 420 is contiguous to EPH field 430 in datagram 400. In addition, ECH field 440 of datagram 400 may include information regarding the length of datagram 400 in lieu of a CRC field, such that the receiver may clearly identify the start and end of the datagram.

Figure 5:
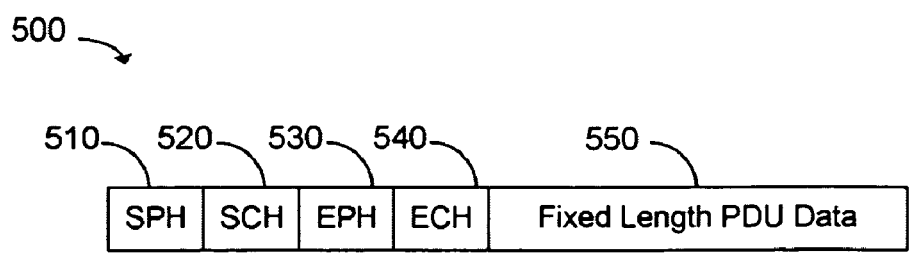
FIG. 5 depicts a datagram for transmission across a serial link according to a third exemplary embodiment.

FIG. 5 depicts a datagram 500 for transmission across a serial link according to a third exemplary embodiment. Like datagram 400 of FIG. 4, datagram 500 has contiguous SPH 510, SCH 520, EPH 530, and ECH 540 bytes located in front of a PDU data field 550. Unlike datagram 400, datagram 500 has a fixed length set for its PDU data field 550. Consequently, length information is no longer needed in ECH field 540. Thus, ECH field 540 may include CRC data, like the ECH field 350 described above for datagram 300.

Figure 6:
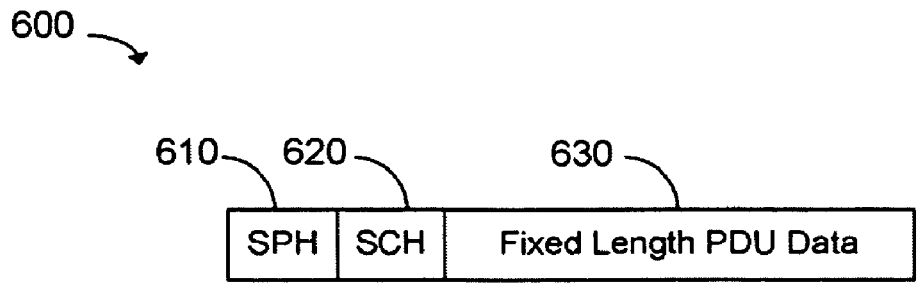
FIG. 6 depicts a datagram for transmission across a serial link according to a fourth exemplary embodiment.

FIG. 6 depicts a datagram 600 for transmission across a serial link according to a fourth exemplary embodiment. Datagram 600 only uses SPH 610 and SCH 620 fields in addition to PDU data field 630. In this case, the EPH and the ECH fields may be omitted because PDU data field 630 has a fixed length. Consequently, only two bytes are appended to the PDU data field 630 instead of four.

Figure 7:
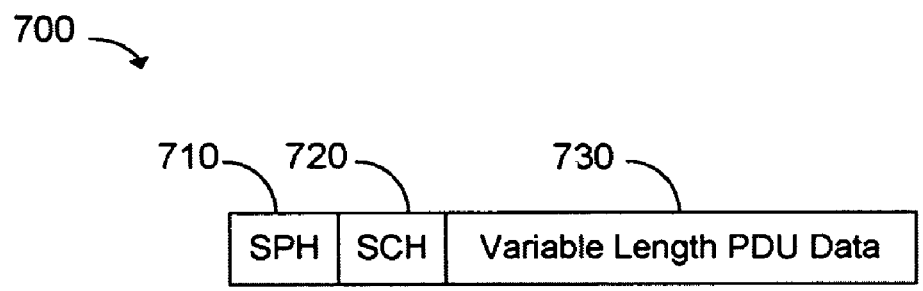
FIG. 7 depicts a datagram for transmission across a serial link according to a fifth exemplary embodiment.

FIG. 7 depicts a datagram 700 for transmission across a serial link according to a fifth exemplary embodiment. Like datagram 600 depicted in FIG. 6, datagram 700 uses only the SPH 710 and the SCH 720 fields in addition to PDU data field 730. Unlike datagram 600, datagram 700 has a PDU data field 730 that may have a variable length. In order to avoid the need for EPH and ECH fields, SPH field 710 provides length information for the PDU data field 730 of datagram 700.

Figure 8:
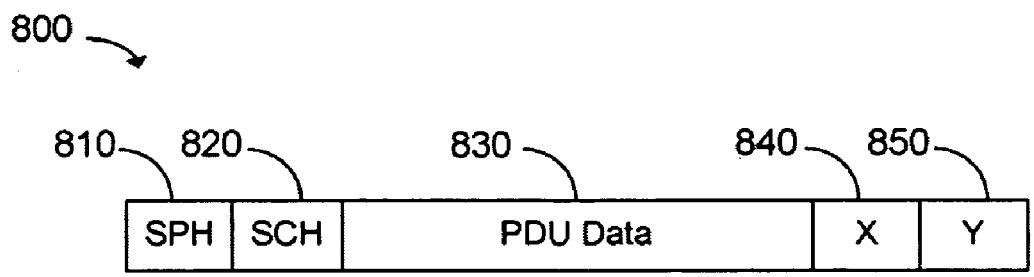
FIG. 8 depicts a datagram for transmission across a serial link according to a sixth exemplary embodiment.

FIG. 8 depicts a datagram 800 for transmission across a serial link according to a sixth exemplary embodiment. Datagram 800, like datagram 700 depicted in FIG. 7, has a PDU data field 830 of variable length. Instead of using SPH field 810 or SCH field 820 to provide information regarding the length of the PDU data field 830, datagram 800 uses markers 840, 850 to delineate its end. Marker 840, 850 is defined as having a first "X" field 840 and a second "Y" field 850. It should be apparent that the "X" field 840 and "Y" field 850 may be any combination of special control characters utilized in 8B/10B.

Thus, in one exemplary embodiment, the SPH field 810 of the next datagram 800 may function as the "X" field 840 for the current datagram 800 and the SCH field 820 of the next datagram 800 may function as the "Y" field 850 for the current datagram 800. Thus, in this embodiment, only two bytes of overhead are required for each datagram, as the SPH and SCH fields 810, 820 serve as the ending marking for the preceding packet. In another exemplary embodiment, markers 840, 850 may be two bytes of an IDLE sequence when no new datagrams 800 are transmitted across the serial link.

Figure 9:
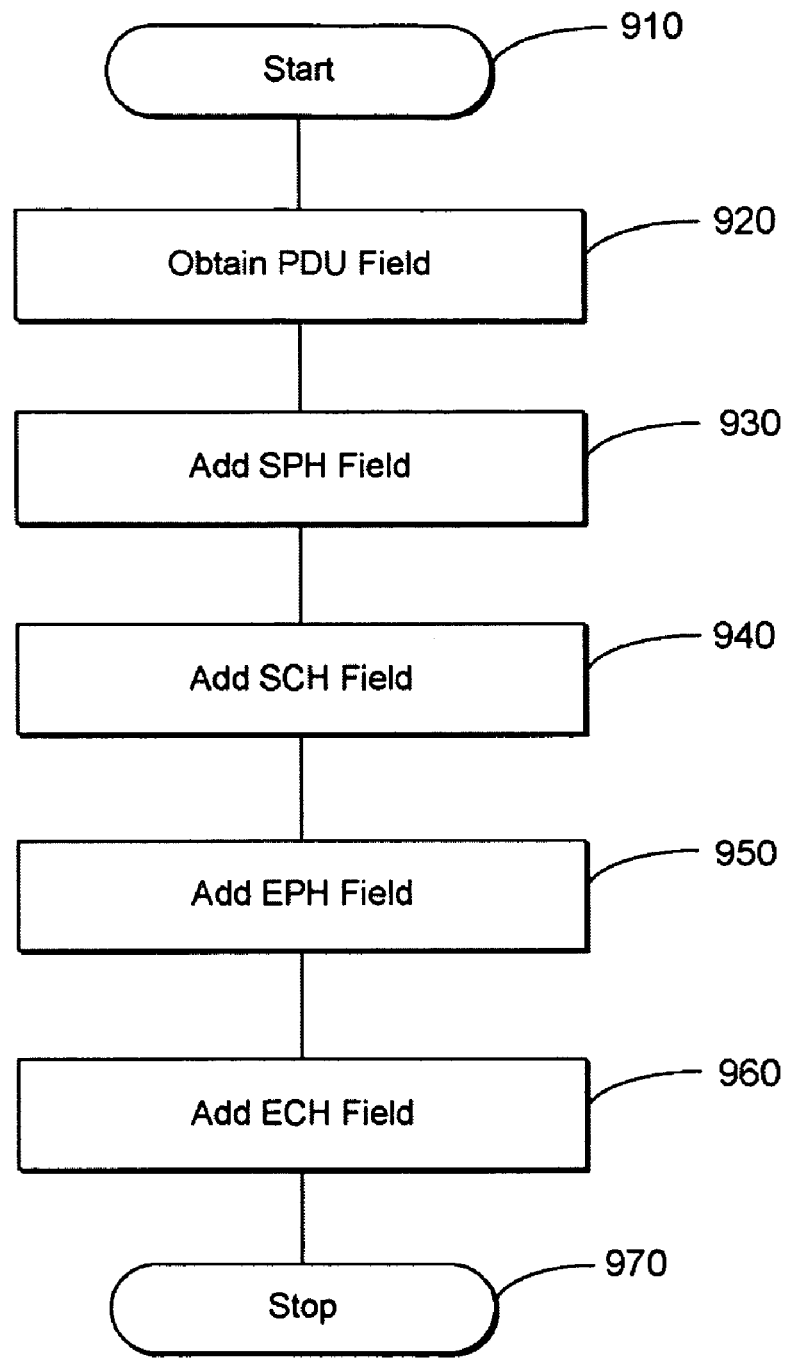
FIG. 9 depicts a method of assembling a datagram for transmission across a serial link.

FIG. 9 depicts a method 900 of assembling a datagram for transmission across a serial link. Method 900 starts at step 910 and proceeds to step 902, where transmitter 110 obtains a PDU field. The transmitter 110 then adds a SPH field in step 930 and a SCH field in step 940. The remaining two steps, adding an EPH field in step 950 and adding an ECH field in step 960, are optional as some exemplary embodiments may omit both the EPH field and the ECH field. Method 900 stops at step 970.

Accordingly, a transmitter 110 may utilize method 900 to generate the datagrams described above in connection with FIGS. 3-8. Upon receipt of the datagram, receiver 150 may identify the datagram based on the information included in the special fields. Accordingly, by implementing this process, a transmitter 110 and receiver 150 may effectively communicate over a serial link, while significantly reducing the amount of overhead.

Figure 10:
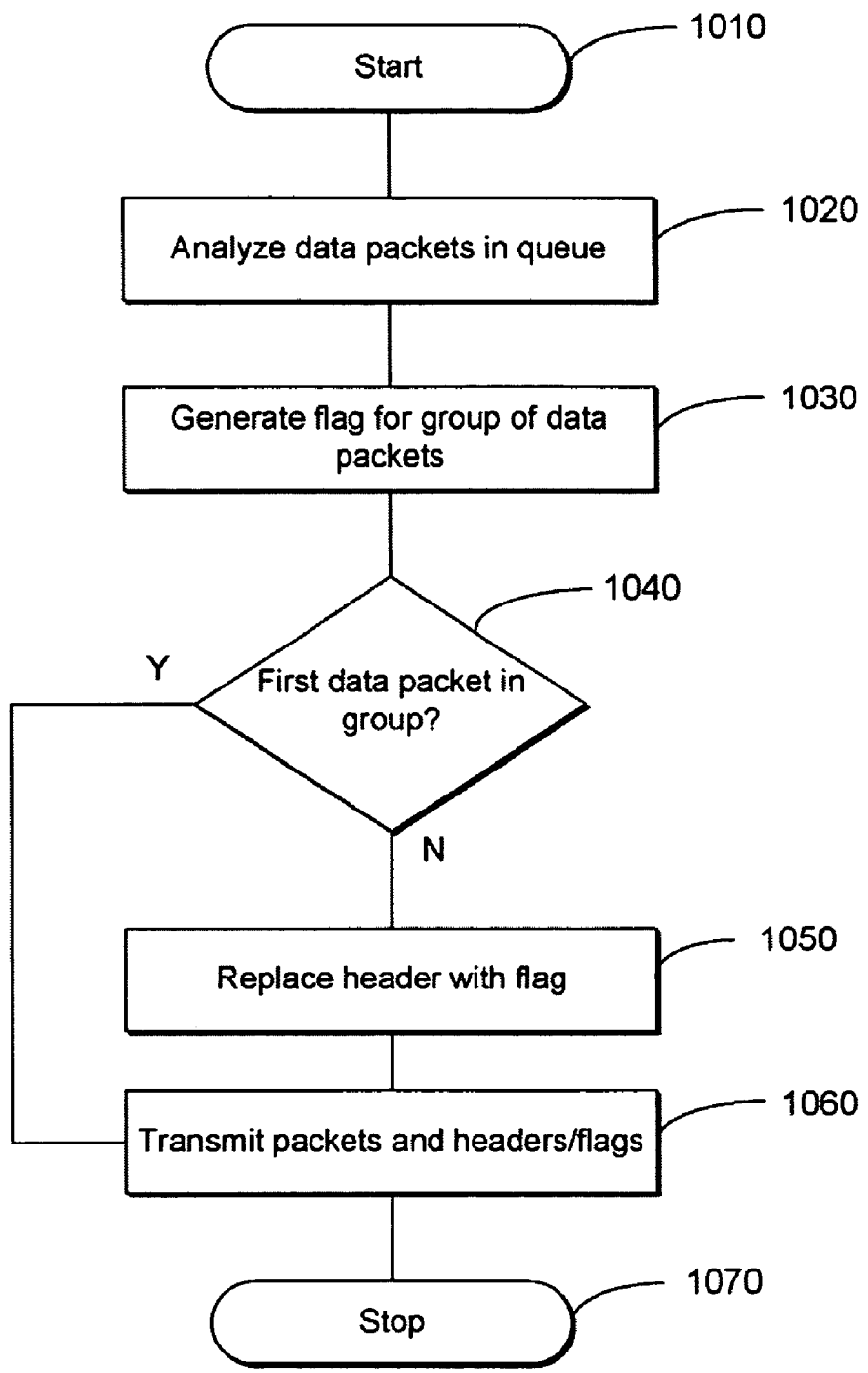
FIG. 10 depicts a transmission method that replaces matching headers with flags.

FIG. 10 depicts a transmission method 1000 that replaces matching headers with flags. In various exemplary embodiments, method 1000 is implemented by a transmitter 110 to reduce the amount of serial link bandwidth used by datagram headers.

Figure 11:
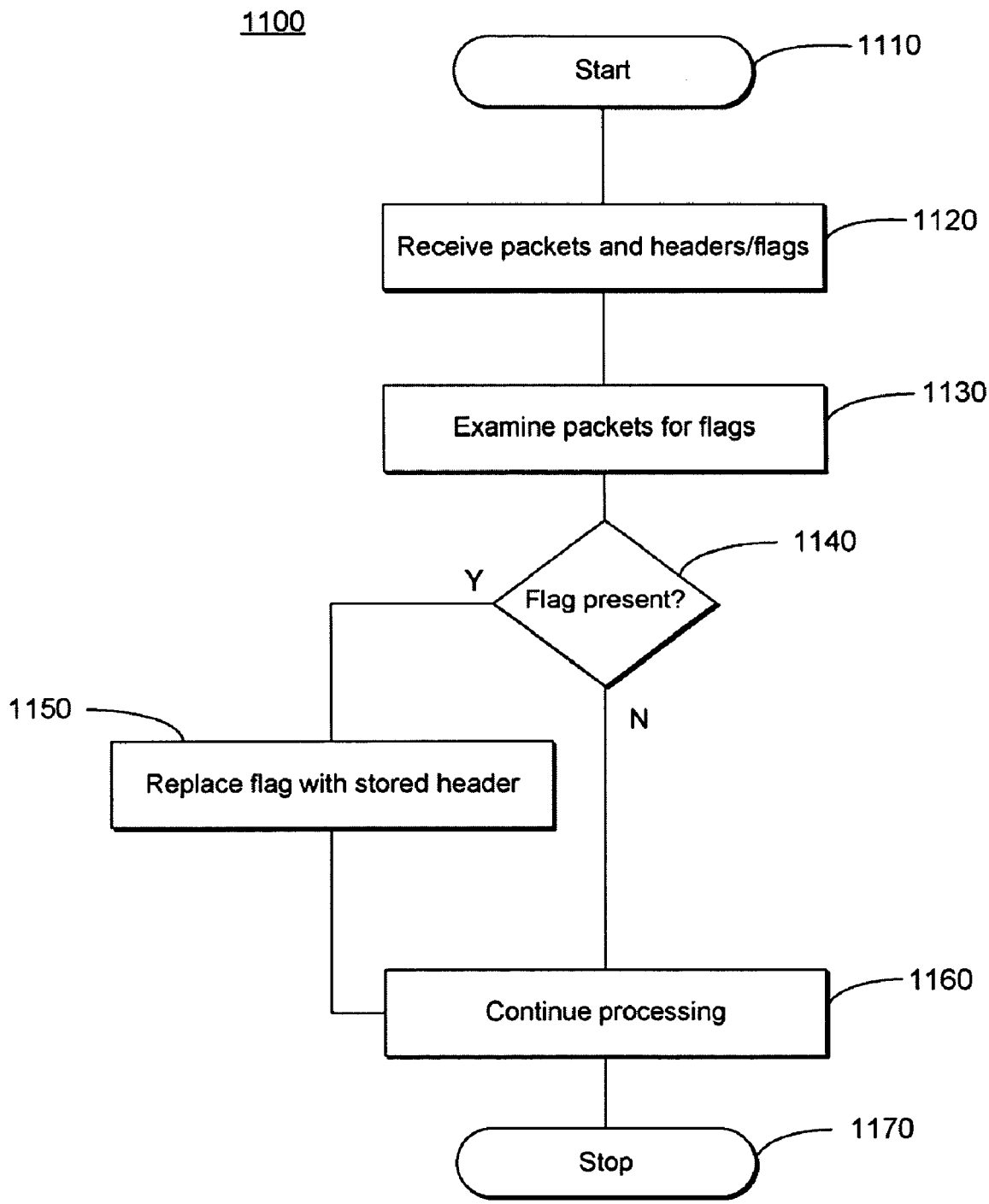
FIG. 11 depicts a reception method that replaces flags with stored headers.

8B/10B control characters may be used as flags in FIGS. 10 and 11 to inform the receiver when to reuse the stored packet header. As a further advantage, the 8B/10B control characters provide an efficient method to send flags from the transmitter to the receiver because an 8B/10B scheme is already used to delineate packets and convey timing information. By overlaying the flag information onto this scheme, no additional bandwidth is required across the midplane.

Exemplary method 1000 starts in step 1010, and proceeds to step 1020, where the transmitter 110 analyzes data packets in its queue. Transmitter 110 identifies groups of data packets in the queue that share an identical header. As a result, transmitter 110 can generate flags in step 1030 based upon its analysis of the queue.

In step 1040, the transmitter separates the first data packet in the group from all subsequent data packets. For all packets in the group except for the first data packet, exemplary method 1000 then proceeds to step 1050, where the header of the datagram is replaced with the flag. Method 1000 continues directly to step 1060 where the datagrams are transmitted with flags, except for the first data packet, which still retains its initial header.

In summary, for subsequent data packets in a group with the same header, the header is replaced by the flag such that the transmitter sends only the flag and the payload of the datagram. These flags are small in size when compared to packet headers, so method 1000 effectively 'compresses' the packet header, increasing the amount of data that can be sent across the midplane. Method 1000 stops at step 1070.

FIG. 11 depicts a reception method 1100 that replaces flags with stored headers. A data receiver 150 performs an operation that is substantially the inverse of the transmission method 1000 of FIG. 10 in order to rebuild packets. Method 1100 starts in step 1110.

In step 1120, the receiver 150 obtains a datagram including a header and/or a flag. For a group of sequential data packets with the same header, only the first data packet in the group will have a header. All subsequent data packets will have flags instead of headers.

In step 1130, receiver 150 examines the datagram to determine whether a flag is present. When in step 1140, a flag is present, method 1100 proceeds to step 1150, where receiver 150 accesses the header information from the first data packet in the group and replaces the flag in the datagram with the stored header information. For the first data packet in the group, execution skips directly to step 1160.

In step 1160, normal packet processing continues. Thus, receiver 150 may decode the packet to retrieve the underlying data. Alternatively, receiver 150 may forward the datagram to another receiver. Other operations performed on the datagram will be apparent to those of skill in the art. Method 1100 then proceeds to step 1160, where exemplary method 1100 stops.

The transmission and use of flags may follow a proprietary protocol that makes the method robust and reliable in high availability redundant systems. Special 8B/10B control characters and periodic retransmission of packet headers help to ensure the receiver is properly synchronized to the transmitter. Considerable compression may be achieved by replacing redundant headers with flags.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the preceding disclosure, description, and figures are for illustrative purposes only and do not in any way limit the invention, which is defined only by the claims.

What is claimed is:

1. A method of assembling, with a processor, a datagram transmitted to or received from a serial link, the method comprising:
   obtaining, with the processor, a Protocol Data Unit (PDU) field that comprises customer traffic having a given length;
   adding, with the processor, a Start-of-PDU Header (SPH) field to said PDU field, wherein the SPH field of a subsequent datagram marks a last byte of the PDU field in a current datagram and the SPH field indicates whether the PDU filed has a normal status or an abort status; and
   adding, with the processor, a SPH Control (SCH) field to said SPH field and said PDU field to assemble said datagram, wherein said assembled datagram has no more than two bytes of overhead, wherein said PDU field has a variable length and said SPH field identifies said length of said PDU field.

2. The method of claim 1, wherein said SCH field is appended before an initial byte of said PDU field.

3. The method of claim 1, wherein IDLE sequence defines said length of a current PDU field by marking a last byte of said current PDU field.

* * * * *